(12) United States Patent
McNamara

(10) Patent No.: US 6,209,536 B1
(45) Date of Patent: Apr. 3, 2001

(54) VENTURI APPARATUS FOR DEEP FRYER

(75) Inventor: Albert Charles McNamara, San Antonio, TX (US)

(73) Assignee: Ultrafryer Systems, Inc., San Antonio, TX (US)

( * ) Notice: Subject to any disclaimer, the term of this patent is extended or adjusted under 35 U.S.C. 154(b) by 0 days.

(21) Appl. No.: 09/432,622

(22) Filed: Nov. 3, 1999

(51) Int. Cl.[7] .................................................. A47J 37/12
(52) U.S. Cl. ..................................... 126/391.1; 239/427
(58) Field of Search ........................... 126/391.1, 376.1; 99/403; 285/147.1, 148.4; 239/432, 427

(56) References Cited

U.S. PATENT DOCUMENTS

| | | | | |
|---|---|---|---|---|
| 898,864 | * | 9/1908 | Futterman | 239/427 |
| 1,354,531 | * | 10/1920 | Anthony | 126/152 R |
| 2,053,568 | * | 9/1936 | Levin | 126/391.1 |
| 2,124,186 | * | 7/1938 | Childs | 126/391.1 |
| 2,176,869 | * | 10/1939 | Childs | 126/391.1 |
| 2,429,360 | * | 10/1947 | Kells | 126/391.1 |
| 2,450,195 | * | 9/1948 | Grantham | 285/147.1 |
| 2,670,788 | * | 3/1954 | MacFarlane | 239/427 |
| 5,101,806 | * | 4/1992 | Hunt et al. | 126/391.1 |
| 5,178,422 | * | 1/1993 | Sekerchak | 285/147.1 |
| 5,253,566 | * | 10/1993 | McCabe et al. | 126/391.1 |
| 5,632,197 | * | 5/1997 | Lubawy et al. | 99/403 |

OTHER PUBLICATIONS

Product specification sheet for Imperial "Elite 40 lb. Fryer," model # IFS–50, Imperial Commercial Cooking Equipment, Duarte, CA.

Product specification sheet for Pitco Prialator "Advanced Gas Fryer System," model AG14S–C/FD–SS, Pitco Prialator, Inc., Concord, NH.

Product specification sheet for Vulcan "TK Fryer Family," models TK35, TK45 and TK65, Vulcan–Hart Co., Louisville, KY (1997).

* cited by examiner

Primary Examiner—Ira S. Lazarus
Assistant Examiner—Sara Clarke
(74) Attorney, Agent, or Firm—Banner & Witcoff, Ltd.

(57) ABSTRACT

A fryer system has a vat containing at least one heat exchange tube, and a gas supply port. A venturi is connected at a first end to the gas supply port. A nozzle of a burner is located proximate a first end of a heat exchange tube. At least three elbows operably connect the venturi to the nozzle. A first elbow is connected to the venturi and a length of conduit, a last elbow is connected to the nozzle and a length of conduit, and each other elbow is connected to adjacent elbows by lengths of conduit.

6 Claims, 4 Drawing Sheets

VENTURI APPARATUS FOR DEEP FRYER

INTRODUCTION

The present invention relates to a venturi apparatus for a gas heated deep flyer, and more particularly, to a venturi apparatus having improved mixing characteristics and serviceability.

BACKGROUND

Deep fryers are commercially used by restaurants, institutional kitchens, and fast food establishments for cooking a variety of food products, such as french fries, fish, fried chicken, and the like. The food product is cooked by totally immersing it within a vat or tank that is filled with heated oil or shortening. The shortening may be heated using a flow of heated gas that is forced or drawn through heat exchanger tubes located within the cooking vat.

Prior art venturi fed burners have a venturi typically located directly adjacent, and leading straight into, the burner which heats the gas flowing into the heat exchanger tubes. Such a construction does not provide for extensive mixing of gas and air prior to entry into the burner. This location of the venturi apparatus also makes it difficult to place a filter tub under the vat. Other locations of the venturi apparatus may interfere with sensor connections, block the servicing of fryer components, or impede the operation of valves and switches required to operate the fryer.

It is an object of the present invention to provide a venturi for a deep fryer which reduces or wholly overcomes some or all of the aforesaid difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a venturi configuration having improved mixing of gas and air, as well as improved operability and serviceability of a deep fryer.

In accordance with a first aspect, a fryer system has a venturi apparatus for a gas fired deep flyer system including a vat containing at least one heat exchange tube and a gas supply port. A venturi is connected at a first end thereof to the gas supply port. A nozzle is located proximate a first end of one of the at least one heat exchange tubes. The fryer system has at least three 90° elbows. Each elbow has a first outlet and a second outlet. A first 90° elbow is connected at its first outlet to the venturi and at its second outlet to a length of conduit. A last 90° elbow is connected at its first outlet to a length of conduit and at its second outlet to the nozzle. Each 90° elbow is connected to each adjacent 90° elbow by a length of conduit.

In accordance with another aspect, a venturi apparatus for a gas fired deep fryer includes a vat containing at least one heat exchange tube and a gas supply port. A venturi is connected at a first end thereof to the gas supply port. A first length of conduit is connected to a second end of the venturi by a first 90° elbow. A second length of conduit is connected to the first length of conduit by a second 90° elbow. A nozzle is proximate a first end of one of the at least one heat exchange tubes and is connected to the second length of conduit by a third 90° elbow.

From the foregoing disclosure, it will be readily apparent to those skilled in the art, that is, those who are knowledgeable or experienced in this area of technology, that the present invention provides a significant technological advance. Preferred embodiments of the invention can provide improved gas and air mixing as well as improved operability and serviceability in a deep fryer. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
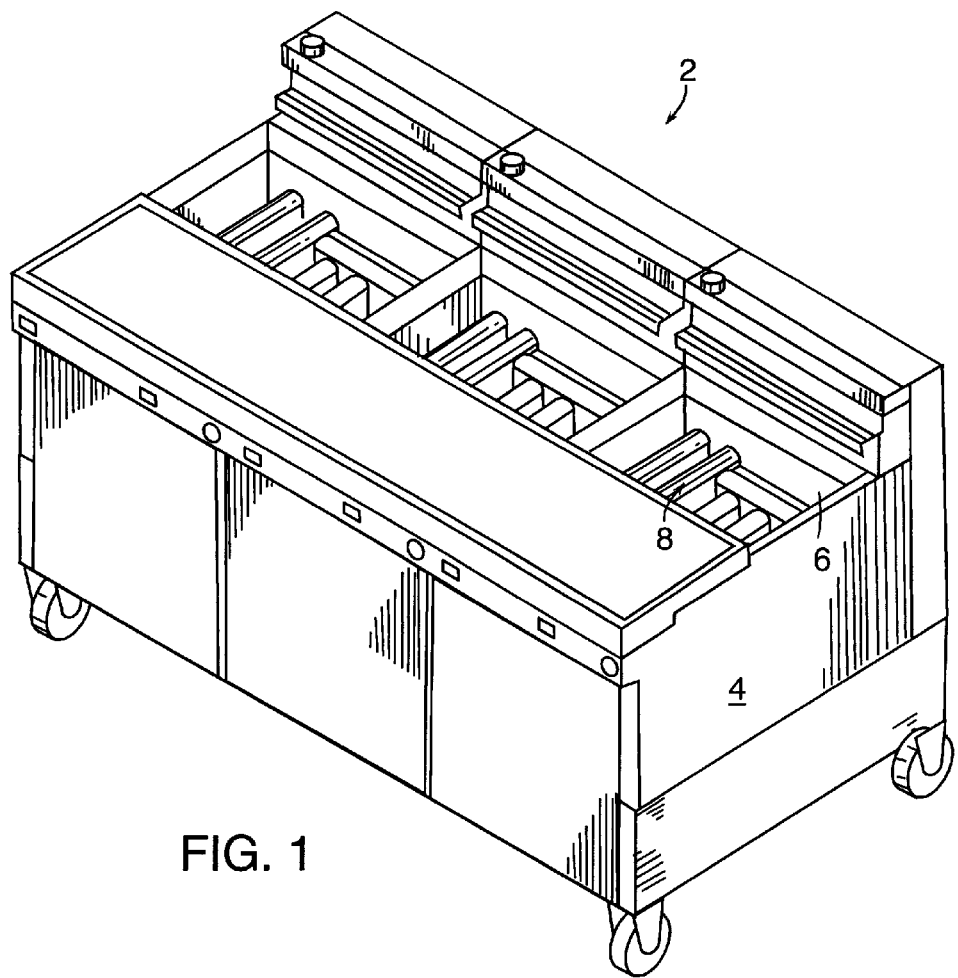
FIG. 1 is a schematic perspective view of a deep fryer of the present invention.

The figures referred to above are not drawn necessarily to scale and should be understood to present a representation of the invention, illustrative of the principles involved. Some features of the venturi apparatus depicted in the drawings have been enlarged or distorted relative to others to facilitate explanation and understanding. Venturi apparatus, as disclosed herein, will have configurations and components determined, in part, by the intended application and environment in which they are used.

DETAILED DESCRIPTION OF CERTAIN PREFERRED EMBODIMENTS

Referring to FIG. 1, a gas fired deep fryer according to the present invention is shown generally by reference numeral 2. Deep fryer 2 includes a housing 4, and vats 6 for holding the shortening, oil, or other cooking medium. A heat exchanger 8 is positioned within each vat 6 to pass a heat exchange fluid through the vat, heating the shortening. Due to its efficiency and economic availability, the heat exchange fluid generally used in the present invention and in prior art gas fryers is air; however, other gaseous fluids or liquids may of course also be considered as the development thereof permits.

In embodiment illustrated in FIG. 1, deep fryer 2 is shown with three vats 6. It is to be appreciated that deep fryer 2 may have any number of vats 6. In the embodiment illustrated in FIGS. 2–4, deep fryer 52 has a single vat 6.

Figure 2:
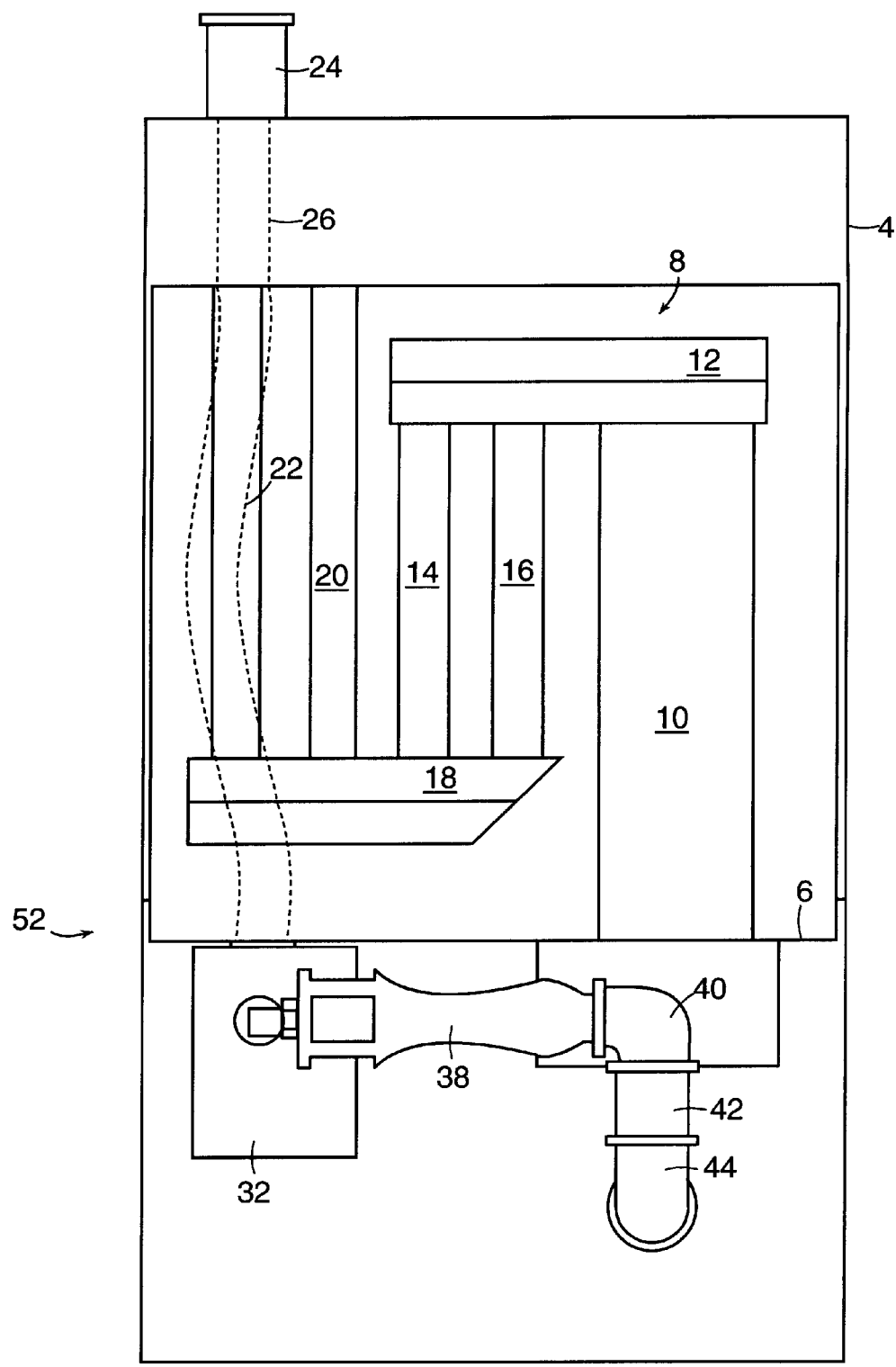
FIG. 2 is a schematic plan view of an alternative embodiment of a deep fryer of the present invention.

As seen in FIG. 2, heat exchanger 8 has a plurality of heat transfer or heat exchange tubes. In a preferred embodiment, the heated fluid passes through heat exchange tube 10, is churned in mixing plenum 12, passes through heat exchange tubes 14, 16, is churned in mixing plenum 18, and exits vat 6 through heat exchange tubes 20, 22. Heat exchange tube 10 preferably has a circular cross section. Mixing plenums 12, 18 preferably have a generally rectangular cross section with a top formed of two portions which angle downwardly from a peak toward the side walls, seen more clearly in FIG. 3. Heat exchange tubes 14, 16, 20, 22 preferably have a cross sectional shape of a flattened cylinder with parallel sides and curved ends, seen more clearly in FIG. 4. In a preferred embodiment of the present invention, vat 6 has internal dimensions of 20"×20", 18"×18", or 14"×14", although any other desired dimensions could also be used. Heat exchanger 8 is therefore correspondingly sized to be disposed within vat 6.

Figure 3:
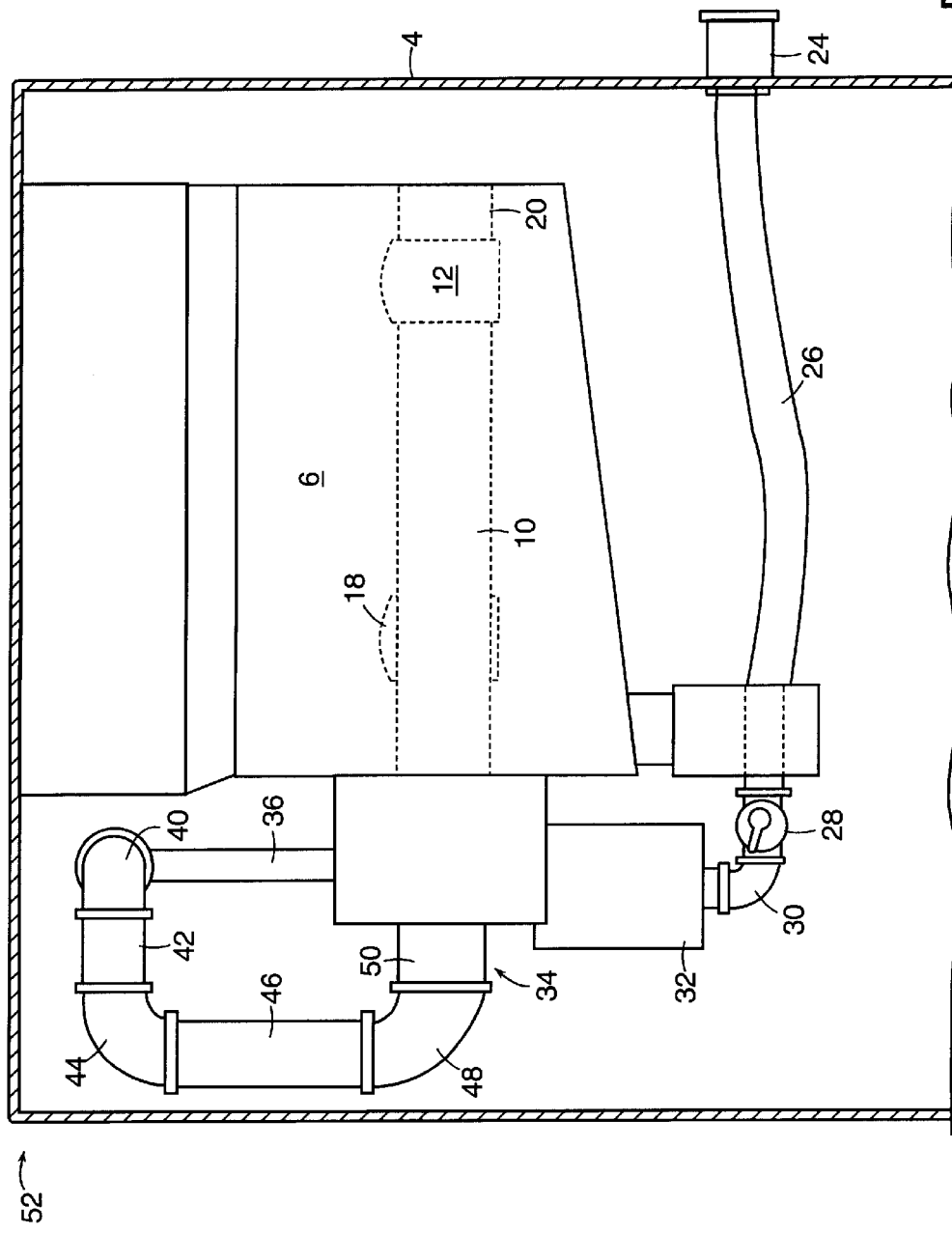
FIG. 3 is a schematic side elevation of the deep fryer of FIG. 2.
Figure 4:
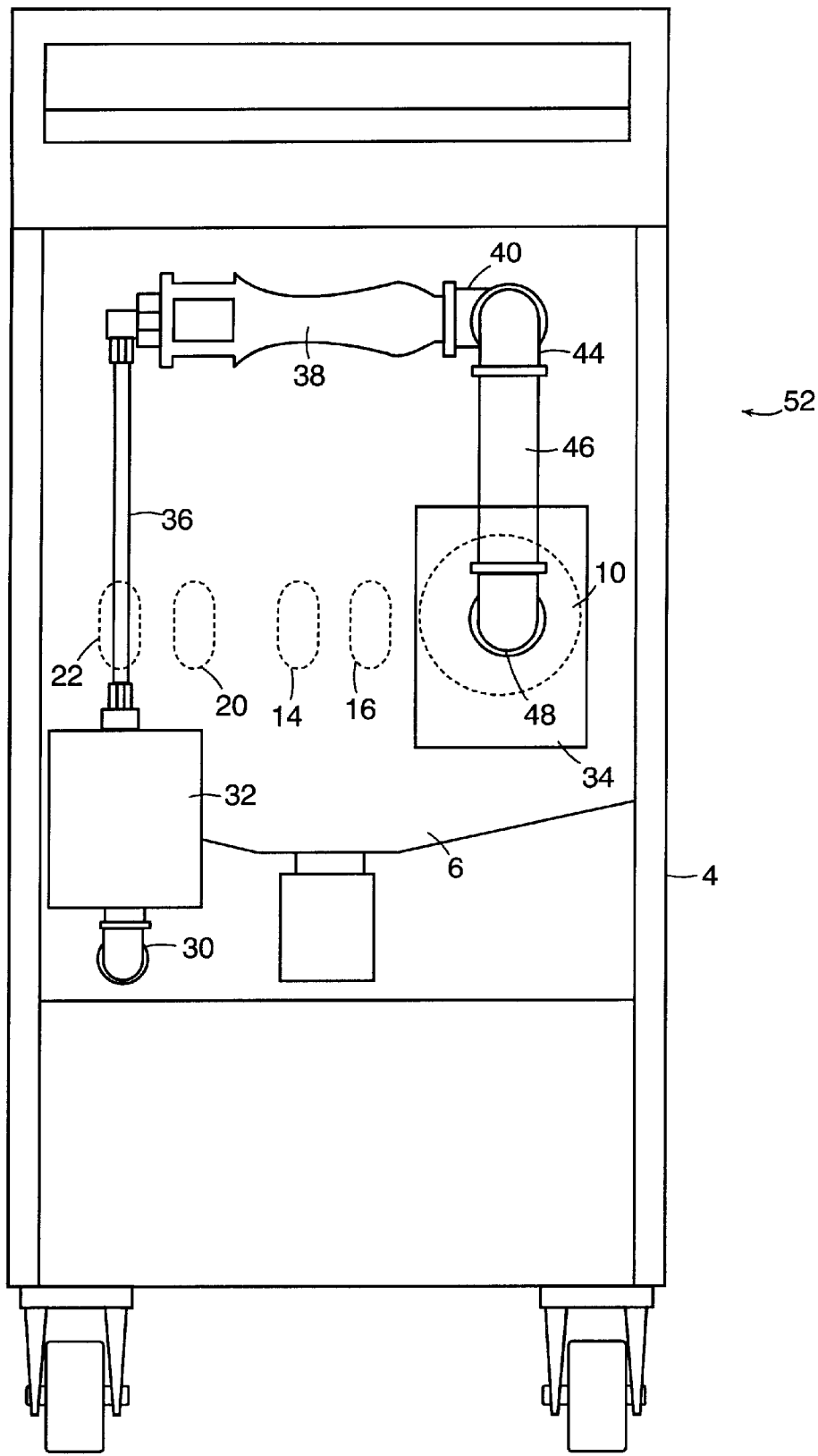
FIG. 4 is a schematic front elevation of the deep fryer of FIG. 2.

As seen in FIGS. 2–4, gas is supplied from a reservoir or other supply source (not shown) to inlet port 24. Flexible supply line 26 is connected at a first end to inlet port 24 and at a second end to shutoff valve 28. A 90° elbow 30 connects shutoff valve 28 to flow control valve 32, which regulates the volume of gas flowing to the burner 34. Flow control valve 32 is thermostatically controlled to regulate the temperature of the shortening in vat 6 in a known manner. Supply line 36 connects flow control valve 32 to a venturi 38.

In order to improve the mixing of air and gas in the piping between venturi 38 and burner 34, a plurality of elbows, connected by lengths of pipe or conduit, are provided. In the preferred embodiment illustrated in FIGS. 2–4, a first 90° elbow 40 is connected to venturi 38. A first length of conduit or pipe 42 is connected at a first end to first elbow 40 and at a second end to second 90° elbow 44. A second length of conduit or pipe 46 is connected at a first end to second elbow 44 and at second end to third 90° elbow 48. Nozzle 50 of burner 34 is in turn connected to elbow 48. Thus, in the illustrated embodiment, venturi 38 is connected to burner 34 by three 90° elbows 40, 44, 48 and two lengths of conduit 42, 46. The lengths of conduit 42, 46 are, in certain preferred embodiments, substantially straight. It is to be appreciated that more than three such elbows may be connected to one another by lengths of conduit to connect venturi 38 to nozzle 50. It is advantageous, in order to achieve suitable mixing of gas and air, that at least three such elbows be provided.

The plurality of elbows and lengths of conduit provide enhanced mixing of the gas and air mixture, which provides better combustion in burner 34. The plurality of elbows and lengths of conduit advantageously enable venturi 38 to be positioned remotely from burner 34, in contrast with known deep fryers where the venturi is positioned directly adjacent and feeds straight into the burner. Locating venturi 38 remotely from burner 34 makes it easier to insert a filter tub, which is used for cleaning of the shortening, under vat 6. Additionally, the servicing of components of deep fryer 2 and the operation of other valves and switches is improved by locating venturi 38 in a position other than directly adjacent burner 34.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A venturi apparatus for a gas fired deep fryer system comprising, in combination:
    a vat containing at least one heat exchange tube;
    a gas supply port;
    a venturi connected at a first end thereof to the gas supply port;
    a nozzle proximate a first end of one of the at least one heat exchange tubes;
    at least three 90° elbows, each elbow having a first outlet and a second outlet, a first 90° elbow connected at its first outlet to the venturi and at its second outlet to a length of conduit, a last 90° elbow connected at its first outlet to a length of conduit and at its second outlet to the nozzle, wherein each 90° elbow is connected to each adjacent 90° elbow by a length of conduit.

2. The venturi apparatus according to claim 1, wherein each length of conduit is substantially straight.

3. A venturi apparatus for a gas fired deep fryer system comprising, in combination:
    a vat containing at least one heat exchange tube;
    a gas supply port;
    a venturi connected at a first end thereof to the gas supply port;
    a first length of conduit connected to a second end of the venturi by a first 90° elbow;
    a second length of conduit connected to the first length of conduit by a second 90° elbow;
    a nozzle proximate a first end of one of the at least one heat exchange tubes and connected to the second length of conduit by a third 90° elbow.

4. The venturi apparatus of claim 3, wherein the first and second lengths of conduit are substantially straight.

5. The venturi apparatus of claim 3, wherein the second length of conduit extends substantially vertically.

6. The venturi apparatus of claim 3, wherein the first length of conduit extends substantially horizontally.

\* \* \* \* \*